(12) United States Patent
Fujiwara et al.

(10) Patent No.: US 8,310,625 B2
(45) Date of Patent: Nov. 13, 2012

(54) LIQUID CRYSTAL DISPLAY DEVICE

(75) Inventors: Sayuri Fujiwara, Osaka (JP); Kiyoshi Minoura, Osaka (JP); Eiji Satoh, Osaka (JP); Yasushi Asaoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 416 days.

(21) Appl. No.: 12/600,564

(22) PCT Filed: May 2, 2008

(86) PCT No.: PCT/JP2008/001144
§ 371 (c)(1),
(2), (4) Date: Nov. 17, 2009

(87) PCT Pub. No.: WO2008/142832
PCT Pub. Date: Nov. 27, 2008

(65) Prior Publication Data
US 2010/0149456 A1    Jun. 17, 2010

(30) Foreign Application Priority Data
May 18, 2007 (JP) ................ 2007-132908

(51) Int. Cl.
G02F 1/1333 (2006.01)
(52) U.S. Cl. .................... 349/86; 349/113
(58) Field of Classification Search ............ None
See application file for complete search history.

(56) References Cited

U.S. PATENT DOCUMENTS

| | | | |
|---|---|---|---|
| 6,147,728 A | 11/2000 | Okumura et al. | |
| 2001/0040717 A1 | 11/2001 | Minoura et al. | |
| 2002/0154260 A1 | 10/2002 | Uchida et al. | |
| 2005/0088742 A1 | 4/2005 | Fujiwara et al. | |
| 2006/0170633 A1 | 8/2006 | Satoh | |

FOREIGN PATENT DOCUMENTS

| | | |
|---|---|---|
| JP | 4-318518 | 11/1992 |
| JP | 6-222331 | 8/1994 |
| JP | 7-110464 | 4/1995 |
| JP | 11-142819 | 5/1999 |
| JP | 2000-171782 | 6/2000 |
| JP | 2002-333610 | 11/2002 |

OTHER PUBLICATIONS

International Search Report for PCT/JP2008/001144, mailed Jun. 3, 2008.
International Preliminary Report on Patentability mailed Dec. 3, 2009 in corresponding PCT Application No. PCT/JP2008/001144.

Primary Examiner — Richard Kim
(74) Attorney, Agent, or Firm — Nixon & Vanderhye P.C.

(57) ABSTRACT

A liquid crystal display device (100) according to the present invention includes: a scattering liquid crystal panel (110) including a scattering-type liquid crystal layer (140) which is capable of taking a transparent state; and a scattering state and a retroreflection plate (150). The scattering liquid crystal panel (110) before being combined with the retroreflection plate (150) satisfies the relationship of $0.45 \leq \log(I_{0-10}/I_{20-30}) \leq 1.48$, where, regarding light which enters through a rear face (110b) of the scattering liquid crystal panel (110) and goes out through a front face (110a), $I_{0-10}$ represents a mean value of scattering intensity of light which goes out at an angle in a range from 0 degrees to 10 degrees with respect to a normal direction of the front face (110a), and $I_{20-30}$ represents a mean value of scattering intensity of light which goes out in a range from 20 degrees to 30 degrees.

10 Claims, 7 Drawing Sheets

LIQUID CRYSTAL DISPLAY DEVICE

This application is the U.S. national phase of International Application No. PCT/JP2008/001144 filed 2 May 2008, which designated the U.S. and claims priority to JP Application No. 2007-132908 filed 18 May 2007, the entire contents of each of which are hereby incorporated by reference.

TECHNICAL FIELD

The present invention relates to a liquid crystal display device, and more particularly to a retroreflection-type liquid crystal display device.

BACKGROUND ART

In recent years, portable electronic devices such as mobile phones and PDAs (Personal Digital Assistants) are in wide use. As the display sections of portable electronic devices, liquid crystal display devices are used, which have advantages of being thin and light-weight and having low power consumption.

Generic liquid crystal display devices utilize polarizers, and thus have a relatively low efficiency of light utilization. Therefore, in order to realize bright display, it is necessary to increase the intensity of externally-entering light, e.g., a backlight. However, when the intensity of light from a backlight is increased, the power consumption increases. Therefore, liquid crystal display devices have been proposed which realize an improved efficiency of light utilization without employing polarizers, this being done by using a scattering-type liquid crystal layer which switches between a scattering state and a transparent state in accordance with changing voltages.

For example, Patent Document 1 discloses a projection-type liquid crystal display device having a scattering-type liquid crystal layer. A scattering-type liquid crystal layer switches between a transparent state and a scattering state based on voltage, whereby switching between transmission and shielding of projection light is performed.

Patent Document 2 discloses a transmission-type liquid crystal display device having a scattering-type liquid crystal layer. In this transmission-type liquid crystal display device, by using a scattering-type liquid crystal layer which is provided between a liquid crystal panel and a backlight, the directivity of light from the backlight is switched by switching between convergence and scatter of the light emitted from the backlight.

In such a projection-type liquid crystal display device and a transmission-type liquid crystal display device, when a voltage is applied across the scattering-type liquid crystal layer, the scattering-type liquid crystal layer takes a transparent state, whereby the luminance in the frontal direction is increased. Conversely, when no voltage is applied across the scattering-type liquid crystal layer, the scattering-type liquid crystal layer takes a scattering state, whereby the luminance in the frontal direction is decreased.

Other than such a projection-type liquid crystal display device and a transmission-type liquid crystal display device, a reflection-type liquid crystal display device having a scattering-type liquid crystal layer is also known (see, for example, Patent Document 3). A reflection-type liquid crystal display device does not include any backlight or the like, but performs displaying by reflecting light entering from the surroundings, thereby realizing a further reduction of power consumption.

The reflection-type liquid crystal display device disclosed in Patent Document 3 includes a scattering-type liquid crystal layer, a reflection plate having a low-refractive index layer, and a light-absorbing layer. When displaying black, the scattering-type liquid crystal layer takes a transparent state, and the incident light from the surroundings travels through the scattering-type liquid crystal layer and the low-refractive index layer to be absorbed by the light-absorbing layer. In this case, since the incident light does not reach the viewer, the viewer perceives black. On the other hand, when displaying white, the scattering-type liquid crystal layer takes a scattering state, and the light entering from the surroundings is scattered by the scattering-type liquid crystal layer, and thereafter receives total reflection at the interface between the low-refractive index layer and its retainer, thus returning toward the viewer. When the incident light thus reaches the viewer, the viewer perceives white.

There is also known a reflection-type liquid crystal display device having, as a reflective member, a retroreflection member which retroreflects light (for example, Patent Documents 4 and 5). In the present specification, such a liquid crystal display device will also be referred to as a retroreflection-type liquid crystal display device. In the retroreflection-type liquid crystal display devices disclosed in Patent Documents 4 and 5, the scattering-type liquid crystal layer takes a scattering state when displaying white, so that light from the light source is scattered by the scattering-type liquid crystal layer so as to reach the viewer. As a result, the viewer perceives white. On the other hand, when displaying black, the scattering-type liquid crystal layer takes a transparent state, so that light from the light source is reflected by the retroreflection plate so as to return to the light source, and thus the light from the light source does not reach the viewer. As a result, the viewer perceives black.

[Patent Document 1] Japanese Laid-Open Patent Publication No. 6-222331
[Patent Document 2] Japanese Laid-Open Patent Publication No. 11-142819
[Patent Document 3] Japanese Laid-Open Patent Publication No. 2002-333610
[Patent Document 4] Japanese Laid-Open Patent Publication No. 2002-107519
[Patent Document 5] Japanese Laid-Open Patent Publication No. 2006-215106

DISCLOSURE OF INVENTION

Problems to be Solved by the Invention

Figure 10:
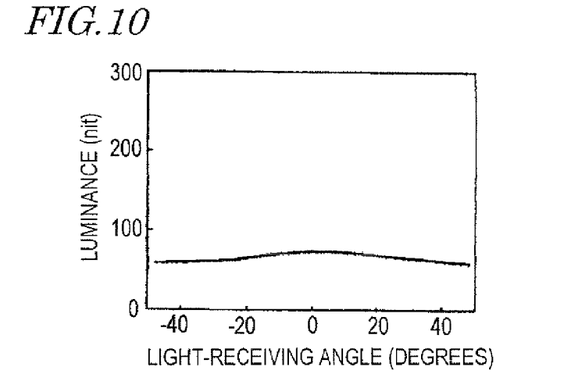
FIG. 10 A graph showing the scattering characteristics of a conventional projection-type liquid crystal display device.

FIG. 10 shows the scattering characteristics of the projection-type liquid crystal display device disclosed in Patent Document 1 in a scattering state. In a scattering state, the scattering-type liquid crystal layer of the projection-type liquid crystal display device substantially uniformly scatters incident light, so that the luminance will be substantially equal across a broad range of angles in the front.

Figure 11:
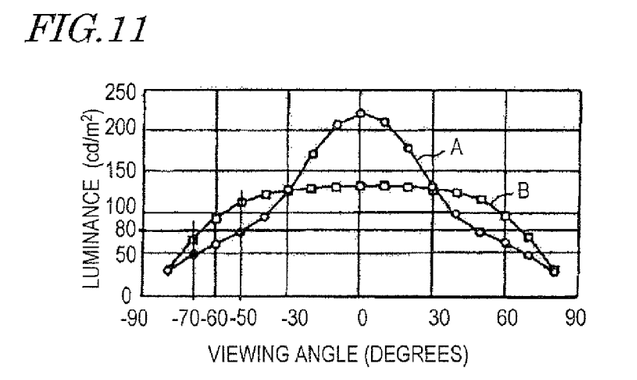
FIG. 11 A graph showing the scattering characteristics of a conventional transmission-type liquid crystal display device.

FIG. 11 shows the scattering characteristics of a transmission-type liquid crystal display device which is disclosed in Patent Document 2. In FIG. 11, A represents a luminance distribution when the scattering-type liquid crystal layer is placed in a transparent state with voltage application, whereas B in FIG. 11 represents a luminance distribution when the scattering-type liquid crystal layer is placed in a scattering state with the voltage being turned off. As shown by A in FIG. 11, when the scattering-type liquid crystal layer is placed in a transparent state, a high frontal luminance is realized. Moreover, as shown by B in FIG. 11, when the scattering-type liquid crystal layer is placed in a scattering state, light is scattered relatively uniformly, so that a wide viewing angle is realized.

Thus, in a projection-type liquid crystal display device and a transmission-type liquid crystal display device, light needs to be sufficiently scattered in a scattering state, and the scattering-type liquid crystal layer needs to perform a strong scatter in a scattering state. As used herein, a strong scatter refers to, in an intensity distribution of scattered light, the intensities of smaller scattering angles being relatively low and the intensity of larger scattering angles being relatively high. On the other hand, a weak scatter refers to, in an intensity distribution of scattered light, the intensities of smaller scattering angles being relatively high and the intensities of larger scattering angles being relatively low.

Figure 12:
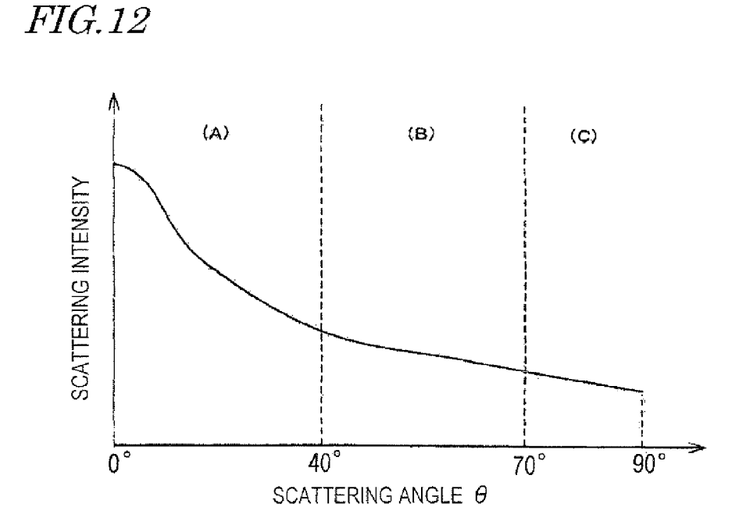
FIG. 12 A graph showing the scattering characteristics of a conventional reflection-type liquid crystal display device.

Patent Document 3 discloses the scattering characteristics of a scattering-type liquid crystal layer suitable for a reflection-type liquid crystal display device. FIG. 12 shows the scattering characteristics of a scattering-type liquid crystal layer of the reflection-type liquid crystal display device disclosed in Patent Document 3. In the reflection-type liquid crystal display device disclosed in Patent Document 3, a total reflection occurs at the interface between a low-refractive index layer and its retainer, when the scattering-type liquid crystal layer is in a scattering state. At this time, if the scatter by the scattering-type liquid crystal layer is too strong, the pixels traveled through by the incident light will be different from the pixel traveled through by the totally-reflected light, so that the contrast ratio and the color purity will decrease. However, if the scatter of the scattering-type liquid crystal layer is too weak, the incident light will be transmitted through the low-refractive index layer and absorbed by the light-absorbing layer, so that only dark displaying will be attained. Moreover, a large component of the light entering from the light source is reflected in the regular reflection direction, so that, if the scatter of the scattering-type liquid crystal layer is too weak, a viewer who is observing from the regular reflection direction will enjoy normal displaying, but a viewer who is observing from a direction other than the regular reflection direction will see an image which is inverted in terms of light/dark. Thus, the reflection-type liquid crystal display device of Patent Document 3 is required to have a scattering-type liquid crystal layer which performs a relatively strong scatter in a scattering state, if not to the extents of the projection-type liquid crystal display device and the transmission-type liquid crystal display device of Patent Documents 1 and 2.

On the other hand, Patent Documents 4 and 5 do not disclose any scattering characteristics of a scattering-type liquid crystal layer which is suitable for a retroreflection-type liquid crystal display device. Even if a retroreflection-type liquid crystal display device having a scattering-type liquid crystal layer whose scatter is strong is produced, as disclosed in Patent Documents 1 to 3, such a retroreflection-type liquid crystal display device will not realize bright display.

The present invention has been made in view of the above problems, and an objective thereof is to provide a retroreflection-type liquid crystal display device which can realize bright display.

Means for Solving the Problems

A liquid crystal display device according to the present invention includes: a scattering liquid crystal panel including a scattering-type liquid crystal layer which is capable of taking a transparent state and a scattering state, the scattering liquid crystal panel having a front face and a rear face; and a retroreflection plate used in combination with the scattering liquid crystal panel, the retroreflection plate retroreflecting at least a portion of light which enters through the front face of the scattering liquid crystal panel and travels toward the rear face, wherein, the scattering liquid crystal panel before being combined with the retroreflection plate satisfies the relationship of 0.45 where, regarding light which enters through the rear face of the scattering liquid crystal panel and goes out through the front face when the scattering-type liquid crystal layer is in the scattering state, $I_{0-10}$ represents a mean value of scattering intensity of light which goes out at an angle in a range from 0 degrees to 10 degrees with respect to a normal direction of the front face, and $I_{20-30}$ represents mean value of scattering intensity of light which goes out in a range from 20 degrees to 30 degrees.

In one embodiment, the scattering liquid crystal panel satisfies the relationship of $0.7 \leq \log(I_{0-10}/I_{20-30}) \leq 1.4$.

In one embodiment, the scattering liquid crystal panel further includes a color filter.

In one embodiment, wherein a distance between the scattering-type liquid crystal layer and the retroreflection plate is no less than 30 μm and no more than 100 μm.

In one embodiment, wherein the retroreflection plate is attached on an outside of the scattering liquid crystal panel via a resin.

A method of producing of a liquid crystal display device includes the steps of: providing a scattering liquid crystal panel including a scattering-type liquid crystal layer which is capable of taking a transparent state and a scattering state, the scattering liquid crystal panel having a front face and a rear face; providing a retroreflection plate; and combining the retroreflection plate with the scattering liquid crystal panel so that the retroreflection plate retroreflects at least a portion of light which enters through the front face of the scattering liquid crystal panel and travels toward the rear face, the method further comprising a step of: before the retroreflection plate is combined with the scattering liquid crystal panel, determining whether the scattering liquid crystal panel satisfies the relationship of $0.45 \leq \log(I_{0-10}/I_{20-30}) \leq 1.48$, where, regarding light which enters through the rear face of the scattering liquid crystal panel and goes out through the front face when the scattering-type liquid crystal layer is in the scattering state, $I_{0-10}$ represents a mean value of scattering intensity of light which goes out at an angle in a range from 0 degrees to 10 degrees with respect to a normal direction of the front face, and $I_{20-30}$ represents a mean value of scattering intensity of light which goes out in a range from 20 degrees to 30 degrees.

Effects of the Invention

According to the present invention, a retroreflection-type liquid crystal display device which realizes bright display can be provided.

DESCRIPTION OF REFERENCE NUMERALS 100 liquid crystal display device
110 scattering liquid crystal panel
120 TFT substrate
122 transparent substrate
130 counter substrate
132 transparent substrate
140 scattering-type liquid crystal layer
150 retroreflection plate

BEST MODE FOR CARRYING OUT THE INVENTION

Hereinafter, with reference to the drawings, Embodiments of the liquid crystal display device according to the present invention will be described. Note that the liquid crystal display device of the present invention is not to be limited to the following Embodiments.

Embodiment 1

Figure 1:
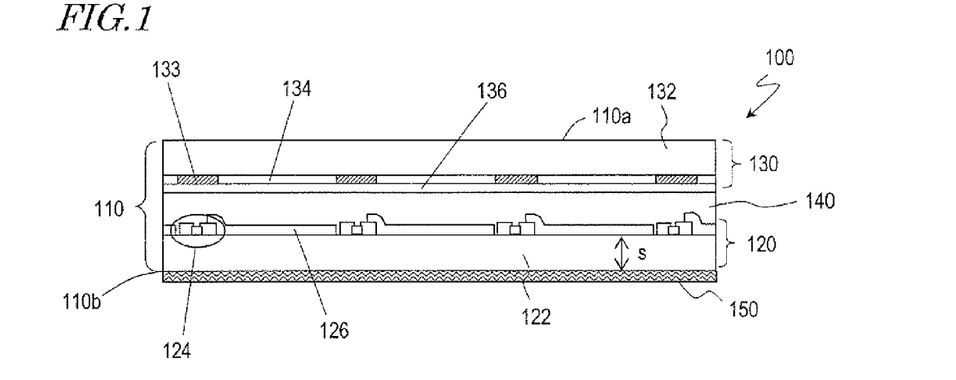
FIG. 1 A schematic diagram for describing a first embodiment of a liquid crystal display device according to the present invention.

FIG. 1 shows a schematic diagram of the liquid crystal display device 100 of the present embodiment. The liquid crystal display device 100 includes a scattering liquid crystal panel 110 and a retroreflection plate 150, such that the scattering liquid crystal panel 110 includes a TFT substrate 120, a counter substrate 130, and a scattering-type liquid crystal layer 140 interposed therebetween. Transparent substrates 122 and 132 of the TFT substrate 120 and the counter substrate 130, each having an insulation ability, are glass substrates, for example. On the transparent substrate 122 of the TFT substrate 120, an active device, e.g., a thin film transistor (Thin Film Transistor: TFT) 124 and a transparent electrode (pixel electrode) 126 corresponding thereto are provided for each pixel. On the transparent substrate 132 of the counter substrate 130, a black matrix 133 and transparent electrodes 134 provided in the apertures of the black matrix 133, and a transparent electrode (counter electrode) 136 are provided. Herein, the transparent electrodes 134 and 136 are composed of the same layer.

The front face (first principal face) 110a of the scattering liquid crystal panel 110 is composed of the transparent substrate 132 of the counter substrate 130, whereas the rear face (second principal face) 110b of the scattering liquid crystal panel 110 is composed of the transparent substrate 122 of the TFT substrate 120. Note that the liquid crystal display device 100 of the present embodiment is a monochrome liquid crystal display device, and therefore lacks color filters.

The scattering-type liquid crystal layer 140 can take a transparent state or a scattering state. For example, the scattering-type liquid crystal layer 140 takes a transparent state under an applied voltage, and takes scattering state in the absence of an applied voltage. For example, the scattering-type liquid crystal layer 140 contains a liquid crystal material and a polymer which is made from a photocurable monomer, such that the polymer is dispersed in the liquid crystal material.

The retroreflection plate 150 of the liquid crystal display device 100 is provided on the transparent substrate 122 of the scattering liquid crystal panel 110. The retroreflection plate 150 is used in combination with the scattering liquid crystal panel 110, so as to retroreflect at least a portion of the light which enters through the front face 110a of the scattering liquid crystal panel 110 and travels toward the rear face 110b. Corner cubes are formed on the retroreflection plate 150, for example. Moreover, the retroreflection plate 150 is attached to the transparent substrate 122 so as to be located on the outside of the scattering liquid crystal panel 110.

Figure 2:
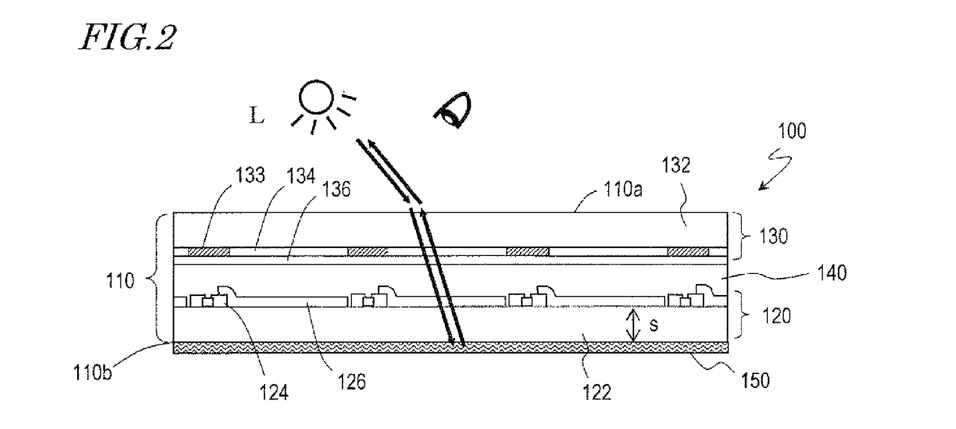
FIG. 2 A schematic diagram for describing a direction of travel of light from a light source L in a liquid crystal display device of Embodiment 1 when displaying black.

Hereinafter, with reference to FIG. 2 and FIG. 3, displaying principles of the liquid crystal display device 100 of the present embodiment will be described. FIG. 2 shows a direction of travel of light from a light source L when displaying black. When the scattering-type liquid crystal layer 140 of a given pixel is in a transparent state, the light entering the scattering liquid crystal panel 110 from the light source L travels through this pixel, and is retroreflected by the retroreflection plate 150. The light having been retroreflected by the retroreflection plate 150 follows a similar locus to that of the light before being reflected, and reaches the light source L. Thus, the light entering the scattering liquid crystal panel 110 from the light source L does not reach a viewer, so that the viewer perceives the pixel as being black.

Figure 3:
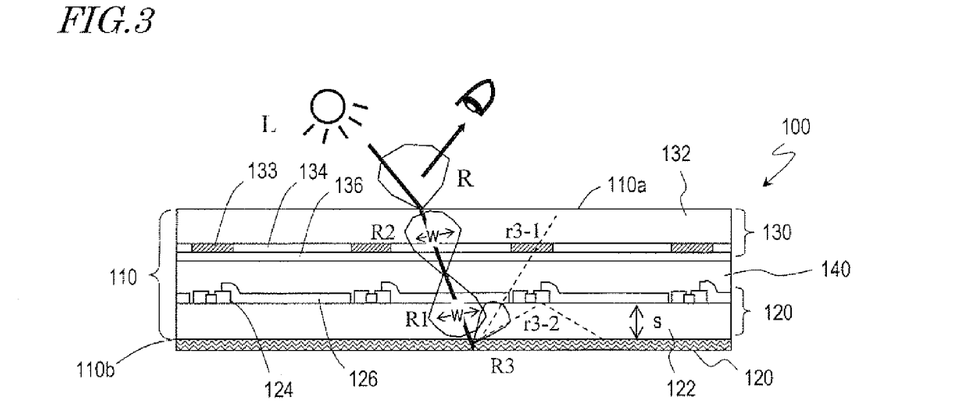
FIG. 3 A schematic diagram for describing a direction of travel of light from a light source L in a liquid crystal display device of Embodiment 1 when displaying white.

FIG. 3 shows a direction of travel of light from a light source L when displaying white. When the scattering-type liquid crystal layer 140 of a given pixel is in a scattering state, the light entering the scattering liquid crystal panel 110 from the light source L is scattered by this pixel and spreads, thus becoming scattered light R1. The scattered light R1 is retroreflected by the retroreflection plate 150, and is again scattered by this pixel to become scattered light R2. As a result, a portion of the scattered light R2 reaches the viewer, so that the viewer perceives the pixel as being white. Thus, when the scattering-type liquid crystal layer 140 is in a scattering state, the scattering-type liquid crystal layer 140 scatters light, whereby the light entering the scattering liquid crystal panel 110 from the light source L is prevented from returning retroreflectively to the light source L.

Moreover, the scattered light R1 contains not only a component that is retroreflected by the retroreflection plate 150 but also a component which is not retroreflected, whereby scattered light R3 is generated. A portion of this scattered light R3 follows the locus of light r3-1, travels through another pixel, as a result of which phenomena such as doubling and mixing of colors occur. Moreover, another portion of the scattered light R3 follows the locus of light r3-2, thus being confined inside the scattering liquid crystal panel 110. Strictly speaking, a portion of the light r3-2 may finally be emitted out of the scattering liquid crystal panel 110, but is ignored here because it will have been significantly decayed. Note that, as the distance s between the scattering-type liquid crystal layer 140 and the retroreflection plate 150 increases, the component to become the scattered light R3 increases, whereby the displaying characteristics are deteriorated.

In the liquid crystal display device 100 of the present embodiment, the scattering liquid crystal panel 110 before being combined with the retroreflection plate 150 satisfies the relationship of $0.45 \leq \log(I_{0\text{-}10}/I_{20\text{-}30}) \leq 1.48$, where, regarding the light entering through the rear face 110b of the scattering liquid crystal panel 110 and going out through the front face 110a when the scattering-type liquid crystal layer 140 is in a scattering state, $I_{0\text{-}10}$ represents a mean value of the scattering intensity of light which goes out at an angle in a range from 0 degrees to 10 degrees with respect to the normal direction of the front face 110a, and $I_{20\text{-}30}$ represents a mean value of the scattering intensity of light which goes out in a range from 20 degrees to 30 degrees. By using the scattering liquid crystal panel 110 having such scattering characteristics in combination with the retroreflection plate 150, the liquid crystal display device 100 can realize bright display. Hereinafter, in the liquid crystal display device 100 having the scattering liquid crystal panel 110 and the retroreflection plate 150, advantages which are obtained from the fact that the scattering liquid crystal panel 110 before being combined with the retroreflection plate 150 satisfies the relationship of $0.45 \leq \log(I_{0\text{-}10}/I_{20\text{-}30}) \leq 1.48$ will be described.

First, a result of studying a degree of scatter of the scattering-type liquid crystal layer that is suitable for a retroreflection-type liquid crystal display device will be described.

If the scatter of the scattering-type liquid crystal layer is strong, the light entering a pixel is strongly scattered by the scattering-type liquid crystal layer, so that scattering ranges w of the scattered light R1, R2 shown in FIG. 3 are expanded. After being retroreflected by the retroreflection plate, these scattered components are again scattered by the scattering-type liquid crystal layer. Thus, when a component of light entering the scattering liquid crystal panel that has once been scattered receives further scattering, a portion thereof is confined inside the scattering liquid crystal panel.

Moreover, as disclosed in Patent Document 5, even if corner cubes of the retroreflection plate are formed with a high precision, a portion of light which enters with a tilt against the imaginary plane of the retroreflection plate is reflected only by the two faces among the three faces composing one unit structure of the corner cubes. Unlike the retroreflective component that has been reflected by each of the three faces, such a twice-reflected component is reflected in a direction which is different from its incident direction. In addition to the presence of such a twice-reflected component, in actuality, components other than the retroreflective component are increased due to the profile irregularities, dimensional accuracy of the retroreflection plate, etc. Since such components other than the retroreflective component are not retroreflected with respect to the incident direction even if reflected by the retroreflection plate, they do not return to the pixel which they traveled through when entering, but will travel through another pixel. As a result, doubling and mixing of colors phenomena may occur, or they may become components which are confined inside the scattering liquid crystal panel or various interfaces and cannot come out, thus deteriorating the display quality. In particular, a greater deterioration in display quality will occur as the distance between the retroreflection plate and the scattering-type liquid crystal layer becomes longer due to the provision of the retroreflection plate outside the scattering liquid crystal panel.

On the other hand, if the scatter of the scattering-type liquid crystal layer is weak, the light entering a pixel is not much scattered, and therefore the scattering range w of the scattered light R1 shown in FIG. 3 becomes narrow. Thus, when the scatter is weak, the unscattered component of the incident light (i.e., the component having a zero scattering angle) increases. Since this component is retroreflected by the retroreflection plate, it returns to the light source L, instead of reaching the viewer, and thus contributes to displaying black rather than white. Thus, when the scatter of the scattering-type liquid crystal layer is weak, bright display cannot be realized.

As will be understood from the above, in a retroreflection-type liquid crystal display device, the degree of scatter of the scattering-type liquid crystal layer should be neither strong nor too weak. Therefore, the degree of scatter of the scattering-type liquid crystal layer needs to fall within a predetermined range.

Hereinafter, the factors which determine a range of degree of scatter of a scattering-type liquid crystal layer that is suitable for a retroreflection-type liquid crystal display device will be discussed. The possible main factors are the retroreflective performance of the retroreflection plate, the panel aperture ratio, the color filters, and the distance between the scattering-type liquid crystal layer and the retroreflection plate.

First, the retroreflective performance of the retroreflection plate will be discussed. A reflection plate having a very low retroreflective property is not to be regarded as a retroreflection plate, but is equivalent to a scattering plate or a reflection plate that mainly performs regular reflection, and thus is not encompassed within the retroreflection plate as referred to herein. As the retroreflection plate herein, a square corner cube array is used which is composed of unit structures each having three square faces that adjoin each other at 90 degrees. A retroreflectance Rr of this retroreflection plate is 75% or more. As the retroreflectance Rr of the retroreflection plate becomes lower, problems such as mixing of colors and doubling become more likely to occur, and the range of degree of scatter of the scattering-type liquid crystal layer that is required of a retroreflection-type liquid crystal display device having predetermined characteristics will become narrower. Therefore, the range of degree of the scattering-type liquid crystal layer is determined by using a retroreflection plate having a high retroreflectance. Note that, as disclosed in Japanese Laid-Open Patent Publication No. 2005-128422, a retroreflection plate having a retroreflectance Rr of 45% or more may also be used.

Next, the panel aperture ratio will be discussed. Even in a monochrome liquid crystal display device, there are regions where transmitted light is shaded by a black matrix (Black Matrix: BM) pattern or a TFT wiring pattern. The proportion of the regions excluding such shading regions i.e., transmission regions) is expressed as a panel aperture ratio. When the panel aperture ratio is low (i.e., shading regions are broad), the efficiency of light utilization is lowered. In particular, when the retroreflection plate is disposed outside the scattering liquid crystal panel so that the distance s between the scattering-type liquid crystal layer and the retroreflection plate is long, bright display cannot be realized due to the influence thereof. Therefore, the range of degree of scatter of the scattering-type liquid crystal layer is determined by using a high-aperture-ratio scattering liquid crystal panel having a panel aperture ratio of 80% or more. If the panel aperture ratio is lower than this, the range of degree of scatter of the scattering-type liquid crystal layer will be narrower.

Next, the color filters will be discussed. In a color liquid crystal display device in which color filters are provided in the scattering liquid crystal panel, if the color of a color filter which is traveled through by the light entering the scattering liquid crystal panel is different from the color of a color filter which is traveled through by the light reflected by the retroreflection plate, its brightness may be lowered or a phenomenon called mixing of colors may occur, where the brightness of pixels which should display black is increased due to a scatter at the interior or interface of the scattering liquid crystal panel. On the other hand, in the case of a monochrome liquid crystal display device where no color filters are provided, as in the case of the liquid crystal display device 100 of the present embodiment, deteriorations in display quality such as lowering of brightness and mixing of colors do not occur, so that the range of degree of scatter of the scattering-type liquid crystal layer can be broadened.

Finally, the distance s between the scattering-type liquid crystal layer and the retroreflection plate will be discussed. As mentioned earlier, the range of degree of scatter of the scattering-type liquid crystal layer becomes broader as the distance s is smaller. Herein, in order to enable fabrication with a commonly-used technique, the distance s is 100 μm. As the distance s becomes shorter than this, the range of degree of scatter of the scattering-type liquid crystal layer becomes broader, but fabrication of the reflection-type liquid crystal display device becomes more difficult. In particular, it is difficult to make the distance s shorter than 30 μm. If the distance s is 100 μm, as shown in FIG. 1, it is possible to attach a retroreflection plate on the outside of the scattering liquid crystal panel. For example, a transparent substrate with a thickness of about 1 mm, specifically 0.7 mm, may be provided, and after thinning this transparent substrate by polishing, a retroreflection plate may be attached to the transparent substrate via a resin having a refractive index similar to the refractive index of the transparent substrate. Note that, when actually producing the retroreflection-type liquid crystal display device, a retroreflection plate may be attached to a transparent substrate having a thickness of about 1 mm without polishing the transparent substrate.

In the above explanation, the retroreflective performance of the retroreflection plate, the panel aperture ratio, the color filters, and the distance between the scattering-type liquid crystal layer and the retroreflection plate were discussed as the main factors for determining the range of degree of scatter of the scattering-type liquid crystal layer. Strictly speaking, however, the optical characteristics of the transparent electrodes and various films composing the TFTs, etc., also affect the determination of the range of degree of scatter of the scattering-type liquid crystal layer. However, since their influences are smaller than those of the aforementioned factors, their descriptions are omitted herein.

Note that the degree of scatter of the scattering-type liquid crystal layer changes depending on the following factors. These factors include, for example, material factors, i.e., the composition fractions of the liquid crystal and the polymer, the refractive index difference between the liquid crystal and the polymer, and the birefringence index of the liquid crystal, and structural factors, i.e., the thickness of the scattering-type liquid crystal layer and the size and pitch of the liquid crystal droplets. There are also process factors, i.e., exposure intensity and exposure temperature.

For example, in order to intensify the scatter, generally speaking, it is preferable to increase the refractive index difference between the polymer and the liquid crystal, i.e., increase the birefringence index of the liquid crystal, increase the thickness of the scattering-type liquid crystal layer, while reducing the size and pitch of the liquid crystal droplets. Moreover, in order to reduce the size and pitch of the liquid crystal droplets, the exposure intensity may be made stronger. However, these are mere generalizations; in actuality, it is necessary to find the best conditions by also taking into consideration the material compositions and the material physical properties.

Based on the above findings, measurement results of the characteristics of three sample scattering-type liquid crystal layers with different scattering characteristics, as well as sample liquid crystal display devices having these sample scattering-type liquid crystal layers, will be described.

First, three sample scattering-type liquid crystal layers are provided. The three sample scattering-type liquid crystal layers differ with respect to the materials (liquid crystal, monomer), exposure conditions, and thickness of the scattering-type liquid crystal layer (cell thickness).

Next, sample scattering liquid crystal panels having the sample scattering-type liquid crystal layers x to z are produced. The sample scattering liquid crystal panels have similar constructions except for their scattering-type liquid crystal layers. In the following descriptions, these scattering liquid crystal panels will also be referred to as samples x, y, and z. Herein, monochrome liquid crystal display devices are contemplated, and no color filters are provided in sample scattering liquid crystal panels x to z.

Sample scattering liquid crystal panels x to z have a retroreflectance Rr of 75% and an aperture ratio of 80%. Although the glass substrate of an actual retroreflection-type liquid crystal display device is preferably 100 μm or less, a thin glass substrate will be likely to break and result in a failure during the scattering characteristics measurements, and therefore glass substrates having a thickness of 700 μm are herein used as the transparent substrates of the TFT substrates. Moreover, the measurement of scattering characteristics may be utilized for the selection of scattering liquid crystal panels, and the glass substrates of only those which have satisfied their criteria may be made thin for use in the retroreflection-type liquid crystal display devices. Note that the distance s between the retroreflection plate and the scattering-type liquid crystal layer in an actual retroreflection-type liquid crystal display device is preferably from 30 μm to 100 μm. However, the distance s may be 700 μm, although it will not make for such good characteristics.

Note that, as the distance s becomes shorter, the brightness of the retroreflection-type liquid crystal display device in the frontal direction will be improved, but its rate of improvement will depend on the retroreflective performance of the retroreflection plate. The influence of the distance s will become smaller as the retroreflective performance becomes higher. For example, in the case where a retroreflection plate having a retroreflectance Rr of 75% or more is used, the brightness in the frontal direction is improved by about 0.7% when the distance s is reduced from 700 μm to 100 μm. Note that, this rate of improvement is slightly larger in a color liquid crystal display device than in a monochrome liquid crystal display device strictly speaking, but is almost the same. In the case where the retroreflectance Rr of the retroreflection plate is 70% or less, the rate of improvement in brightness of a monochrome liquid crystal display device will be about 1.3%, whereas the rate of improvement in brightness of a color liquid crystal display device will be 1.5% or more.

Next, the scattering characteristics of the sample scattering liquid crystal panels are measured. Hereinafter, with reference to FIG. 4, a measurement method of the scattering characteristics of the sample scattering liquid crystal panels will be described.

Figure 4:
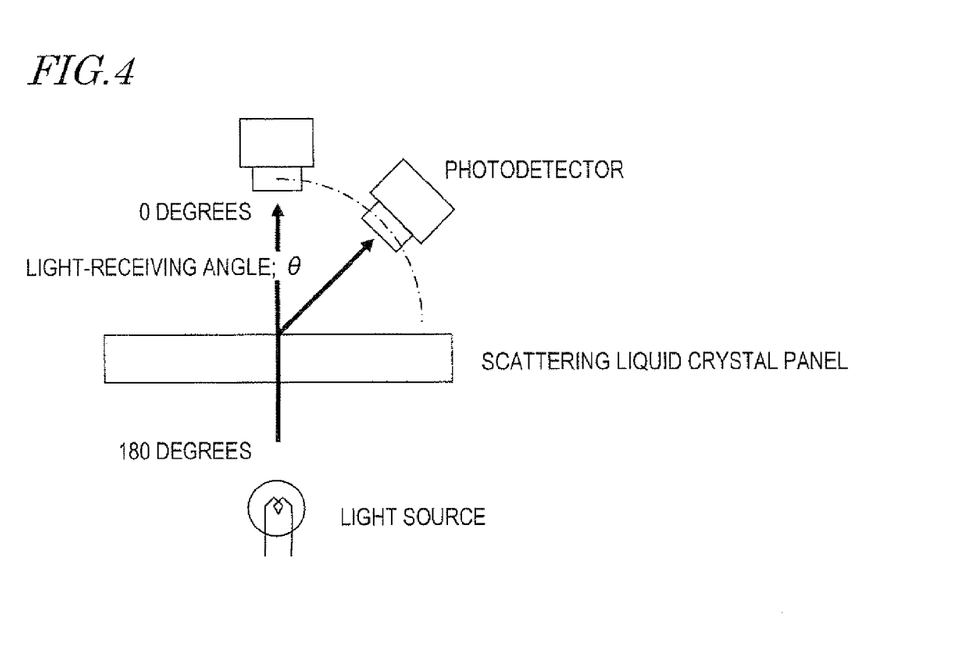
FIG. 4 A schematic diagram for describing a measurement method for the scattering characteristics of a scattering liquid crystal panel.

A light source is placed on the rear face side of a sample scattering liquid crystal panel. As a result, the light source is disposed in a 180-degree position. The scattering-type liquid crystal layer is placed in a scattering state, and the light which has been emitted from the light source and traveled through the sample scattering liquid crystal panel is received at an angle of θ, and the scattering intensity at the light-receiving angle θ is measured. Herein, the normal direction of the front face of the sample scattering liquid crystal panel is defined as 0 degrees.

Figure 5A:
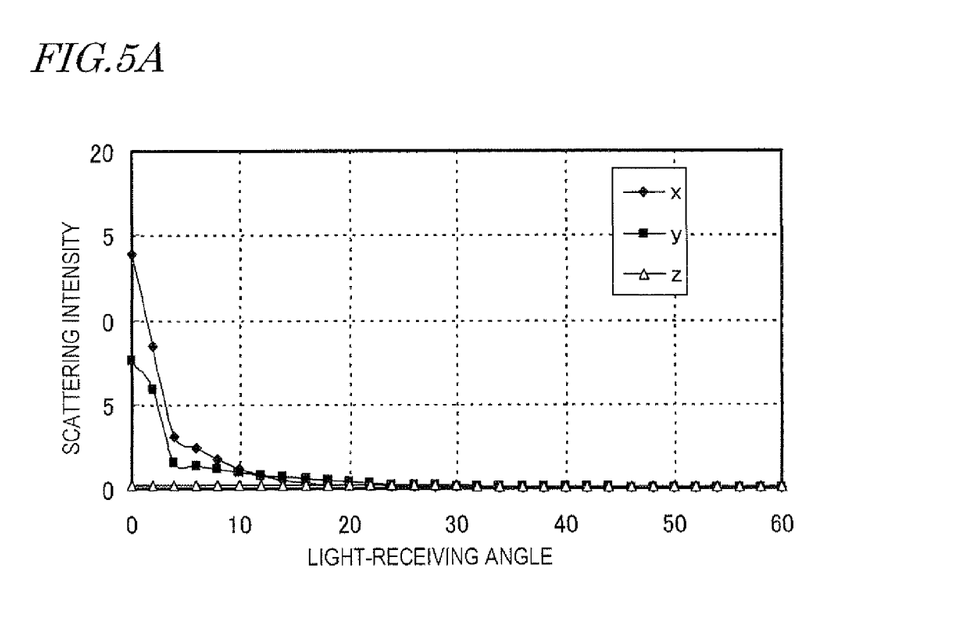
FIG. 5A A graph showing the scattering characteristics of scattering liquid crystal panels.
Figure 5B:
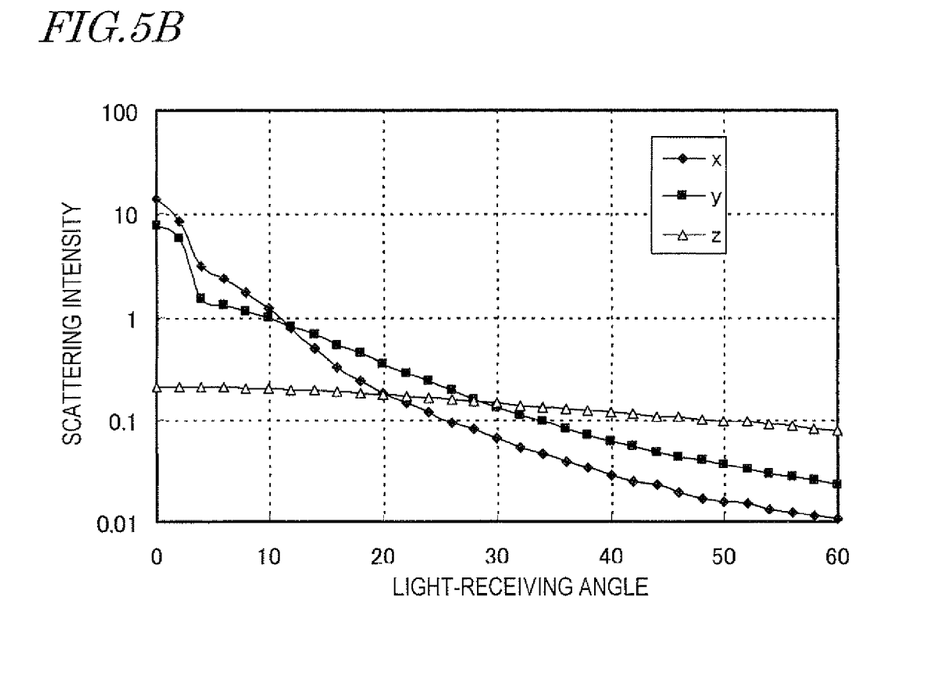
FIG. 5B A graph showing the scattering characteristics of scattering liquid crystal panels.

FIG. 5A and FIG. 5B are graphs each showing the scattering characteristics of sample scattering liquid crystal panels x, y, and z. In the graph of FIG. 5A, the scattering intensity on the vertical axis is expressed in real numbers (antilogarithms). In the graph of FIG. 5B, the scattering intensity on the vertical axis is expressed in logarithms. Note that each is normalized based on the scattering intensity at 0 degrees in a state where the sample scattering liquid crystal panel is not installed (air).

As will be understood from FIG. 5B, the scattering intensity of sample z is smaller than those of samples x and y when the light-receiving angle is small, and greater than those of samples x and y when the light-receiving angle is large. This means that the scatter of sample z is stronger than those of samples x and y. A comparison between samples x and y indicates that the scattering intensity of sample y is smaller than that of sample x when the light-receiving angle is small, and is greater than that of sample x when the light-receiving angle is large. Thus, the scatters of samples x to z are stronger in the order of "x→y→z".

Next, sample scattering liquid crystal panels x to z are combined with the same type of retroreflection plates to produce sample liquid crystal display devices. In the following descriptions, these liquid crystal display devices will also be referred to as samples x, y, and z.

Figure 6:
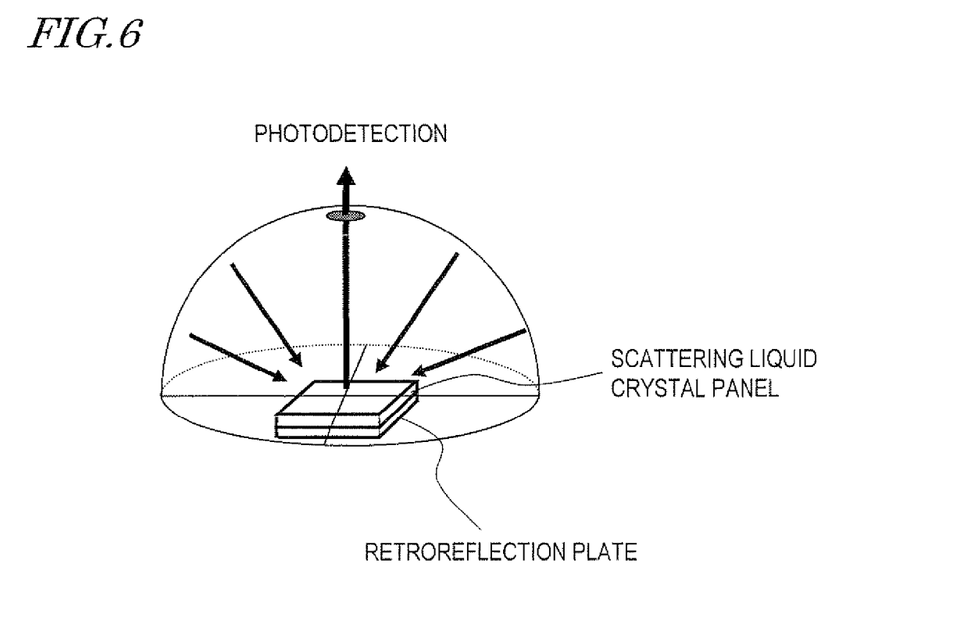
FIG. 6 A schematic diagram for describing a measurement method for the brightness of a liquid crystal display device.

Next, the brightness of the sample liquid crystal display devices is measured. Hereinafter, with reference to FIG. 6, the measurement method for the brightness of the sample liquid crystal display devices will be described. A sample liquid crystal display device is disposed at a predetermined position of a measurement apparatus, and the scattering-type liquid crystal layer is placed in a scattering state (white displaying). Then, light is radiated from the entire hemisphere toward the sample liquid crystal display device, and out of the light reflected by the sample liquid crystal display device, the light which has been reflected at a predetermined angle with respect to the normal direction of the sample liquid crystal display device is received by a photodetector, thereby measuring the brightness of the liquid crystal display device. Note that, although the angle at which the photodetector is disposed will differ depending on the measurement apparatus, the photodetector is set at 0 degrees herein.

Table 1 shows the brightness (d/0) of sample liquid crystal display devices x, y, and z. Note that what is expressed as (d/0) herein are values each normalized so that a received light intensity which is measured of a standard diffusion plate (MgO), instead of a reflection-type liquid crystal display device, equals a reference (100%).

TABLE 1

| sample | x | y | z |
|---|---|---|---|
| (d/0) (%) | 26.2 | 33.2 | 27.4 |

As shown in Table 1, the brightness (d/0) of the sample liquid crystal display devices once increase as the scatter of the scattering-type liquid crystal layer becomes stronger, and then decrease as the scatter of the scattering-type liquid crystal layer becomes further stronger. This is presumably because: when the degree of the scatter reaches a certain point, the zero-scattering angle component, i.e., the retroreflective component, decreases so that the light which is reflected in the frontal direction increases; but when the scatter becomes too strong, the component of the light entering the scattering liquid crystal panel that is confined inside the scattering liquid crystal panel increases, so that the component which is reflected in the frontal direction decreases. It is sample y that most effectively utilizes light among sample liquid crystal display devices x to z, and sample y is realizing bright display.

Now, FIG. 5A and FIG. 5B are referred to again. FIG. 5A and FIG. 5B show angular distributions of light which has been transmitted through the scattering liquid crystal panel, and these distribution shapes conform to the degree of scatter of the scattering-type liquid crystal layer, but it is difficult to compare these distribution shapes themselves as values of degree of scatter. Therefore, the degree of scatter of the scattering-type liquid crystal layer will be expressed by utilizing a mean value of the scattering intensity across a certain angle range. Specifically, a mean value ($I_{0-10}$) of scattering intensity across an angle range (from 0 degrees to 10 degrees) including the straight-traveling transmittance and a mean value ($I_{20-30}$) of scattering intensity across a slightly shallower angle range (from 20 degrees to 30 degrees) are determined, and the ratio therebetween ($I_{0-10}/I_{20-30}$) or a logarithm of the ratio, i.e. $\log(I_{0-10}/I_{20-30})$, is defined as a value representing the degree of scatter of the scattering-type liquid crystal layer. Herein, $I_{0-10}$ corresponds to the straight-traveling transmitted component, whereas corresponds to the scattered component.

In the ratio or the logarithm thereof, a mean value of the scattering intensity across the angle range from 20 degrees to 30 degrees is used as the denominator. This is because of a notion that, a mean value of the scattering intensity across an angle range from 10 degrees to 20 degrees is close to the straight-traveling transmitted component and therefore would not accurately represent the scattering characteristics of the scattering liquid crystal panel, and that, if the scattering intensity at 30 degrees or more were to be measured, the measured scattering intensity would be too low, such that problems such as susceptibility to influences of measurement errors would be highly likely to occur. The reason for employing logarithms is to clarify differences in the range where the scatter is particularly strong, e.g., the range where ($I_{0-10}/I_{20-30}$) is close to 1 (i.e., the range where $\log(I_{0-10}/I_{20-30})$ is close to 0). Note that the ideal scattering characteristics of a reflection-type display device are generally considered to be such that the scattering intensity is substantially constant across a range from 0 degrees to 30 degrees, and that hardly any scatter occurs at any greater angle.

Figure 7A:
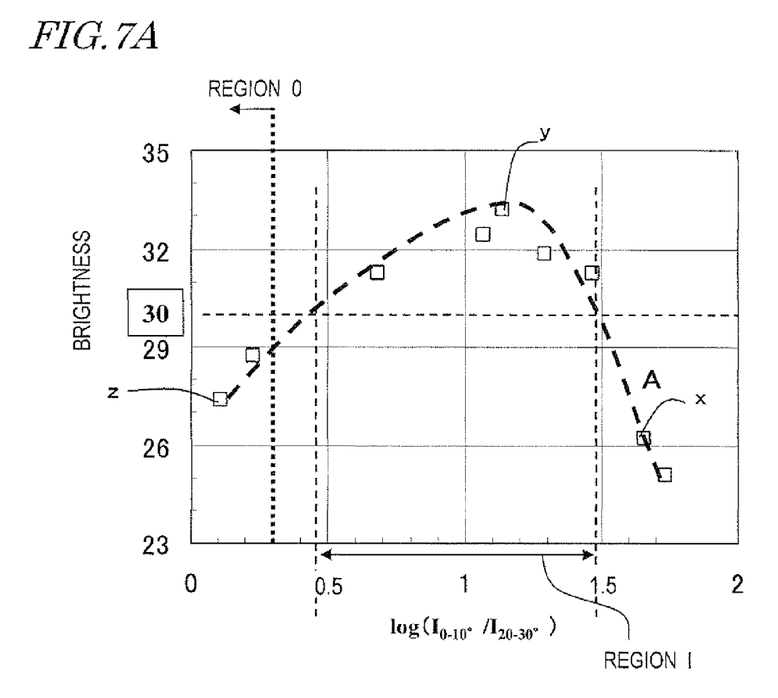
FIG. 7A A graph showing relationships between a ratio representing a degree of scatter of the scattering-type liquid crystal layer and the brightness of a liquid crystal display device in Embodiment 1.

Hereinafter, with reference to FIG. 7A and FIG. 7B, the relationship between the value indicating the degree of scatter of the scattering-type liquid crystal layer and the brightness of the reflection-type sample liquid crystal display device will be described. In the graph of FIG. 7A, logarithms are taken on the horizontal axis, whereas in the graph of FIG. 7B, real numbers (antilogarithms) are taken on the horizontal axis. Note that FIG. 7A and FIG. 7B also show results of samples other than samples x, y, and z. These samples differ with respect to the materials (liquid crystal, monomer), exposure conditions, and cell thickness.

As the scatter becomes stronger, the mean value $I_{20-30}$ increases, and the mean value $I_{0-10}$ decreases. Therefore, when the scatter is strong, the ratio $(I_{0-10}/I_{20-30})$ between them and a logarithm thereof are both small. Conversely, when the scatter is weak, the ratio $(I_{0-10}/I_{20-30})$ and its logarithm are both large. Therefore, both of FIG. 7A and FIG. 7B indicate that the scatter becomes weaker as the value on the x axis becomes larger.

Figure 7B:
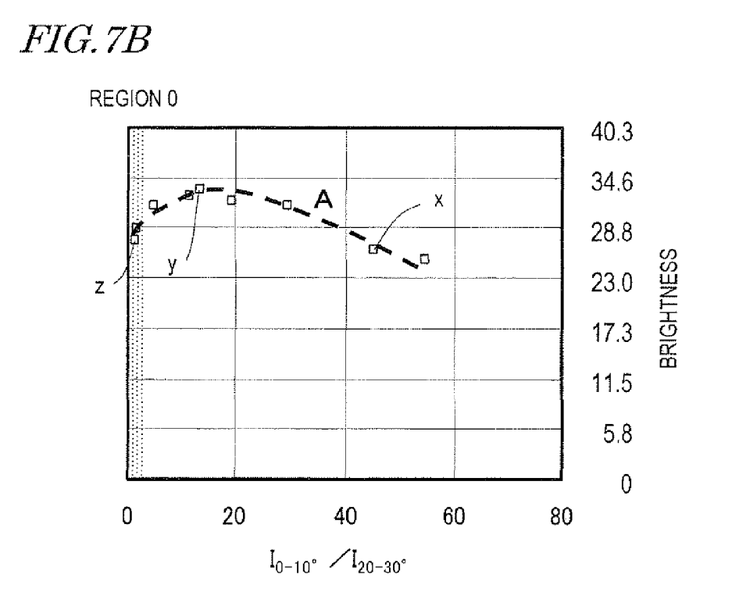
FIG. 7B A graph showing relationships between a logarithm of a ratio representing a degree of scatter of the scattering-type liquid crystal layer and the brightness of a liquid crystal display device in Embodiment 1.

In the graphs of FIG. 7A and FIG. 7B, the brightness of the sample liquid crystal display devices once increase as the scatter becomes weaker, but decrease as the scatter becomes further weaker. As described earlier, when the scatter is too strong, the light entering the scattering liquid crystal panel from the light source is scattered by the scattering-type liquid crystal layer so as to spread, and thus the component which is confined inside the scattering liquid crystal panel increases, so that a sufficient brightness cannot be obtained. When the scatter of the scattering-type liquid crystal layer becomes weak, the component which has been confined inside the scattering liquid crystal panel now comes out of the scattering liquid crystal panel so as to reach the viewer, whereby bright display can be realized. When the scatter becomes even weaker, the light entering from the light source is not sufficiently scattered, and most components thereof return to the light source, thus resulting in a decrease in the component that reaches the viewer.

From the sample liquid crystal display devices, it is determined that a practical monochrome liquid crystal display device would have a brightness of 30 or more. As is also shown in Table 1, sample liquid crystal display devices x and z have brightness of less than 30, i.e., insufficient brightness, and thus cannot attain the merits of a monochrome liquid crystal display device, whereas sample liquid crystal display device y has a brightness of 30 or more, thus being able to display good white.

Now, the values representing the degree of scatter of the scattering-type liquid crystal layer that would correspond to a brightness of 30 or more of the sample liquid crystal display device will be discussed. As will be understood from FIG. 7A, the range of values representing the degree of scatter that is suitable for a monochrome liquid crystal display device is $0.45<\log(I_{0-10}/I_{20-30})<1.48$. In FIG. 7A, this range is indicated as region I. Note that this range corresponds to $2.8<I_{0-10}/I_{20-30}<30$ in FIG. 7B.

For reference, FIG. 7A and FIG. 7B illustrate as region 0 a range indicating the degrees of scatter of the scattering-type liquid crystal layers in Patent Documents 1 and 2. The maximum logarithm and antilogarithm values of region 0 are 0.3 and 2 respectively, these values corresponding to the state of weak scatter (transparent state) which is disclosed in Patent Document 2. The scatters of the scattering-type liquid crystal layers of Patent Documents 1 and 2 are too strong for a retroreflection-type liquid crystal display device.

As will be understood from the results of using sample scattering-type liquid crystal layers with different scattering characteristics, when the scattering liquid crystal panel 110 itself satisfies the relationship of $0.45<\log(I_{0-10}/I_{20-30})<1.48$, where $I_{0-10}$ represents a mean value of the scattering intensity of light in a range from 0 degrees to 10 degrees, and $I_{20-30}$ represents a mean value of the scattering intensity of light emitted in a range from 20 degrees to 30 degrees, the liquid crystal display device 100 having the scattering liquid crystal panel 110 and the retroreflection plate 150 can realize bright display.

Note that, although it generally becomes more difficult to realize a sufficient transparent state as the scatter becomes stronger, since the transparent state differs depending on the applied voltage, it cannot be universally said that a scatter will occur in a transparent state if the scatter is strong. Moreover, even given the same degree of scatter of the scattering-type liquid crystal layer in a scattering state, the electrooptical characteristics will differ depending on its structure (size of the liquid crystal droplets, thickness of the scatter liquid crystal layer, etc.) and the physical properties of the materials.

Hereinafter, a method for producing the liquid crystal display device 100 having the scattering liquid crystal panel 110 and the retroreflection plate 150 will be described.

The scattering liquid crystal panel 110 is produced as follows. First, a TFT substrate 120 and a counter substrate 130 are produced. Transparent substrates 122 and 132 are provided. The transparent substrates 122 and 132 are glass substrates, for example. Next, transparent electrodes are formed on each of the transparent substrates 122 and 132. Specifically, TFTs 124 and transparent electrodes 126 are formed on the transparent substrate 122. As a result, the TFT substrate 120 is produced. Moreover, a black matrix 133 and transparent electrodes 134 as well as a transparent electrode 136 are formed on the transparent substrate 132. Thus, the counter substrate 130 is produced.

Next, the TFT substrate 120 and the counter substrate 130 are attached together via spacers so as to maintain a constant gap, and this gap is filled with a material which at least contains a photocurable monomer, a photopolymerization initiator, and liquid crystal. The material is irradiated with light (e.g., ultraviolet) at a certain temperature (e.g., a temperature at which the material before curing will not transit to the nematic phase), and, at the same time of polymerizing the monomer, a phase separation from the liquid crystal is effected to form the scattering-type liquid crystal layer 140. Note that, the scattering liquid crystal panel 110 has a panel aperture ratio of 80% or more.

It may be determined whether the scattering liquid crystal panel that has been produced satisfies the relationship of $0.45<\log(I_{0-10}/I_{20-30})<1.48$ or not, and any scattering liquid crystal panel which fails to satisfy the above relationship may be excluded from use for a retroreflection-type liquid crystal display device. In other words, as a criterion for evaluating whether a scattering liquid crystal panel is suitable for a retroreflection-type liquid crystal display device or not, a determination as to whether the relationship $0.45<\log(I_{0-10}/I_{20-30})<1.48$ is satisfied or not may be made.

The retroreflection plate 150 is produced as follows. First, a die having retroreflective shapes is provided. Next, a resin is stacked on a film such as polyethylene terephthalate (PET), and the retroreflective shapes on the die are transferred onto this resin. Thereafter, a highly reflective metal such as silver is vapor-deposited onto the resin. Note that the retroreflection plate 150 has a retroreflectance Rr of 75% or more.

Next, via a resin having a similar refractive index to that of the transparent substrate 122, the retroreflection plate 150 is attached to the scattering liquid crystal panel 110. At this time, the distance s between the scattering-type liquid crystal layer 140 and the retroreflection plate 150 is 100 μm. Moreover, before attaching the retroreflection plate 150, the transparent substrate 122 of the scattering liquid crystal panel 110 may be made thinner. The reflection-type liquid crystal display device 100 having the retroreflection plate 150 on the outside of the scattering liquid crystal panel 110 is produced as above.

Embodiment 2

In the above descriptions, the liquid crystal display device is a monochrome liquid crystal display device. However, the present invention is not limited thereto. The liquid crystal display device may be a color liquid crystal display device.

Hereinafter, with reference to FIG. 8A to FIG. 9B, a second embodiment of the liquid crystal display device according to the present invention will be described. The liquid crystal display device 100 of the present embodiment is a color liquid crystal display device, and has a similar construction to that of the liquid crystal display device described above in Embodiment 1 with reference to FIG. 1, except that color filters 134 are provided in apertures of the black matrix 133. Therefore, in order to avoid redundancy, any description that is similar to those in Embodiment 1 will be omitted.

In the liquid crystal display device 100 of the present embodiment, a colored layer including a black matrix 133 which is black in color and including color filters 134 in the three colors of red (R), green (G), blue (B) is provided in the counter substrate 130. These color filters 134 are color filters for use in generic reflection-type liquid crystal display devices, having a luminous transmittance of 70%. If the chroma is higher than this, the transmittance will be lower so that the brightness will be deteriorated, thus further limiting the available scattering characteristics.

In the liquid crystal display device 100 of the present embodiment, the scattering liquid crystal panel 110 before being combined with the retroreflection plate 150 satisfies the relationship of $0.7 \leq \log(I_{0-10}/I_{20-30}) \leq 1.4$, where, regarding the light entering through the rear face 110b of the scattering liquid crystal panel 110 and going out through the front face 110a when the scattering-type liquid crystal layer 140 is in a scattering state, $I_{0-10}$ represents a mean value of the scattering intensity of light which goes out at an angle in a range from 0 degrees to 10 degrees with respect to the normal direction of the front face 110a, and $I_{20-30}$ represents a mean value of the scattering intensity of light which goes out in a range from 20 degrees to 30 degrees. By using the scattering liquid crystal panel 110 having such scattering characteristics in combination with the retroreflection plate 150, the liquid crystal display device 100 can realize bright display.

Hereinafter, in the color liquid crystal display device 100 having the scattering liquid crystal panel 110 and the retroreflection plate 150, advantages which are obtained from the fact that the scattering liquid crystal panel 110 before being combined with the retroreflection plate 150 satisfies the relationship of $0.7 \leq \log(I_{0-10}/I_{20-30}) \leq 1.4$ will be described.

Similarly to Embodiment 1 described above, measurement results of the characteristics of five sample scattering-type liquid crystal layers with different scattering characteristics, as well as sample liquid crystal display devices having these sample scattering-type liquid crystal layers, will be described.

First, five sample scattering-type liquid crystal layers are provided. The five samples differ with respect to the materials (liquid crystal, monomer), exposure conditions, and cell thickness.

Next, sample scattering liquid crystal panels having the sample scattering-type liquid crystal layers a to e are produced. The sample scattering liquid crystal panels have similar constructions except for their scattering-type liquid crystal layers. Sample scattering liquid crystal panels a to e have a retroreflectance Rr of 75% and an aperture ratio of 80%. Also herein, glass substrates having a thickness of 700 μm are used as the transparent substrates of the TFT substrates. Next, the scattering characteristics of these sample scattering liquid crystal panels are measured by a measurement method similar to what has been described above with reference to FIG. 4.

Figure 8A:
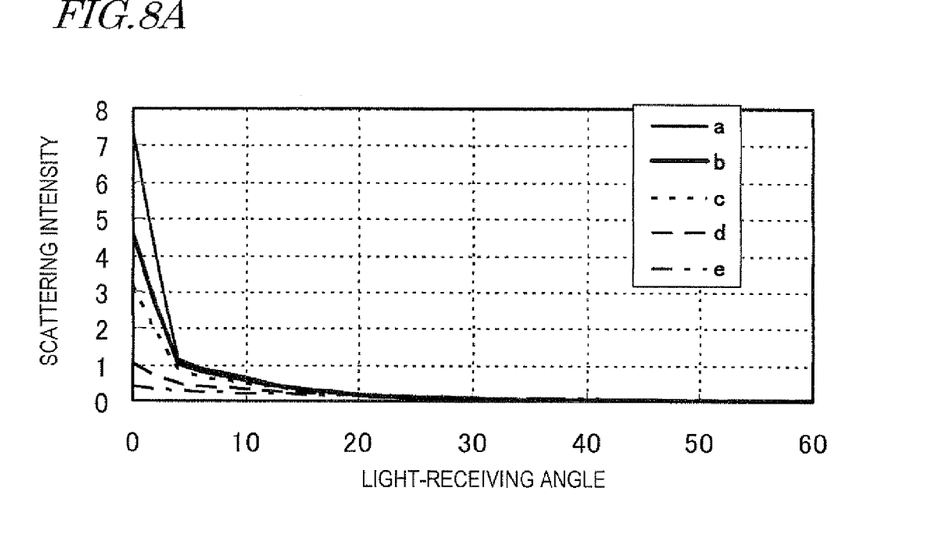
FIG. 8A A graph showing the scattering characteristics of scattering liquid crystal panels.
Figure 8B:
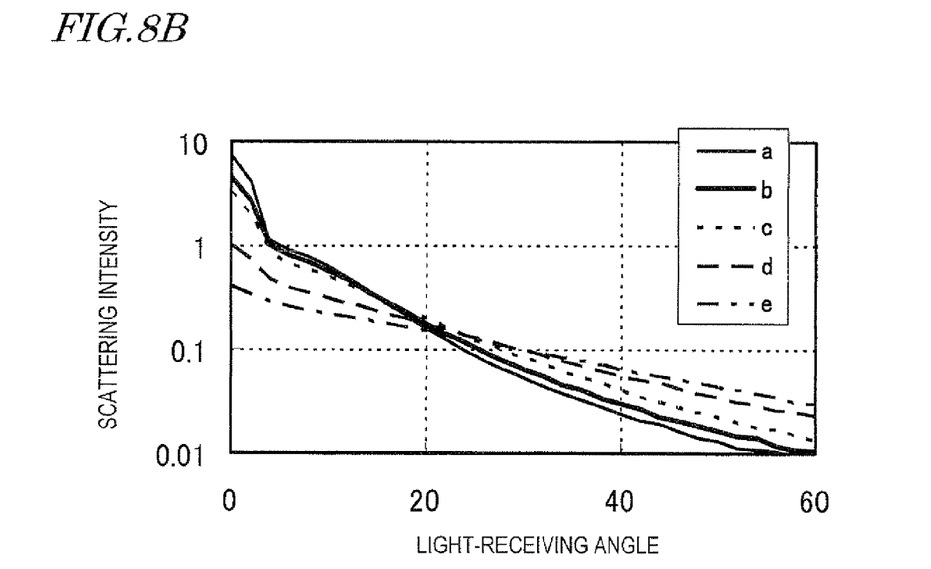
FIG. 8B A graph showing the scattering characteristics of scattering liquid crystal panels.

Hereinafter, with reference to FIG. 8A and FIG. 8B, the scattering characteristics of the scattering liquid crystal panels in the color liquid crystal display devices will be described. In the graph of FIG. 8A, the scattering intensity on the vertical axis is expressed in real numbers (antilogarithms). In the graph of FIG. 8B, the scattering intensity on the vertical axis is expressed in logarithms.

As shown in FIG. 8A and FIG. 8B, the scattering intensities when the light-receiving angle is small are smaller in the order of samples a, b, c, d, and e, whereas the scattering intensities when the light-receiving angle is large are larger in the order of samples a, b, c, d, and e. Thus, the degrees of scatter of the five sample scattering-type liquid crystal layers are stronger in the order of "a→b→c→d→e".

Table 2 shows results of measuring the brightness of the five sample liquid crystal display devices similarly to the measurement method described above with reference to FIG. 6. Note that these measurements are taken while placing the liquid crystal layer of a plurality of unit pixels in a scattering state, assuming that RGB are the unit pixels. Such measurements are a common method of evaluating a display device.

TABLE 2

| sample | a | b | c | d | e |
|---|---|---|---|---|---|
| (d/0) (%) | 14.9 | 15.9 | 16.6 | 14.4 | 13.8 |

As shown in Table 2, the brightness (d/0) of the liquid crystal display devices once increases as the scatter of the scattering-type liquid crystal layer becomes stronger, and then decrease as the scatter of the scattering-type liquid crystal layer becomes further stronger. This is presumably because: when the degree of the scatter reaches a certain point, the retroreflective component decreases so that the intensity of the light which is reflected in the frontal direction increases; but when the scatter becomes too strong, the component of the light entering the scattering liquid crystal panel that is confined inside the scattering liquid crystal panel increases, so that the intensity of the light which is reflected in the frontal direction decreases. It is sample c that most effectively utilizes light among samples a to e.

Figure 9A:
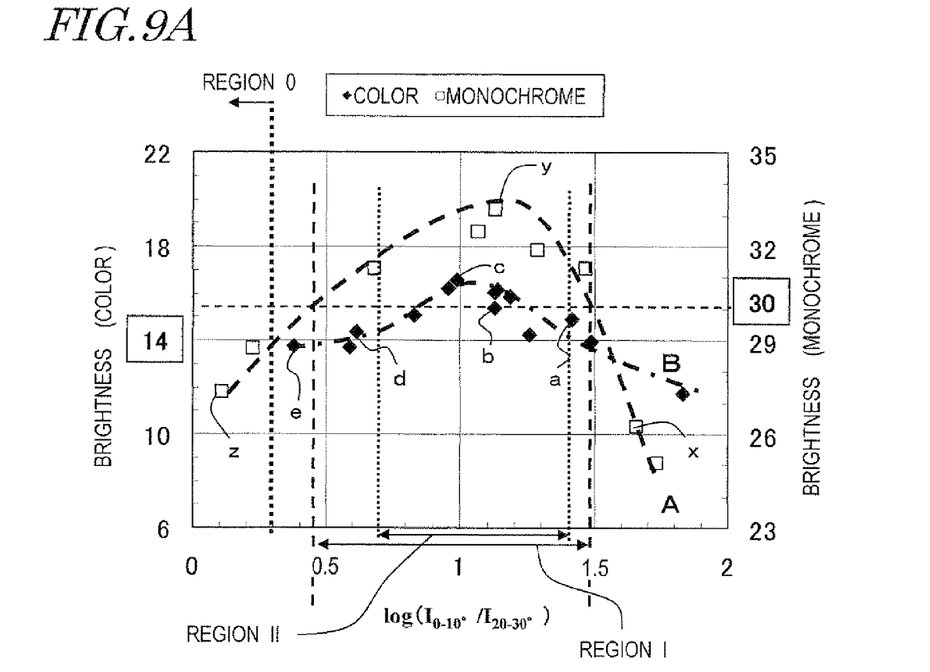
FIG. 9A A graph showing relationships between a ratio representing a degree of scatter of the scattering-type liquid crystal layer and the brightness of a liquid crystal display device in Embodiment 2.

Now, with reference to FIG. 9A and FIG. 9B, the relationship between the value indicating the degree of scatter of the scattering-type liquid crystal layer and the brightness of the reflection-type sample liquid crystal display device will be described. In the graph of FIG. 9A, logarithms are taken on the horizontal axis, whereas in the graph of FIG. 9B, real numbers (antilogarithms) are taken on the horizontal axis. Note that FIG. 9A and FIG. 9B also show results of samples other than samples a to e. Again, these samples differ with respect to the materials (liquid crystal, monomer), exposure conditions, and cell thickness. Furthermore, for reference, FIG. 9A and FIG. 9B also show results of the sample monochrome liquid crystal display devices shown in FIG. 7A and FIG. 7B. As has been described above in Embodiment 1, again, a ratio between the mean value $I_{0-10}$ of scattering intensity and the mean value $I_{20-30}$ of scattering intensity ($I_{0-10}/I_{20-30}$) or a logarithm thereof is used as the value indicating degree of scatter.

As has been described above, when the scatter is strong, the ratio ($I_{0-10}/I_{20-30}$) between them and a logarithm thereof are both small. Conversely, when the scatter is weak, the ratio ($I_{0-10}/I_{20-30}$) and its logarithm are both large. Therefore, both of FIG. 9A and FIG. 9B indicate that the scatter becomes weaker as the value on the vertical axis becomes larger.

Figure 9B:
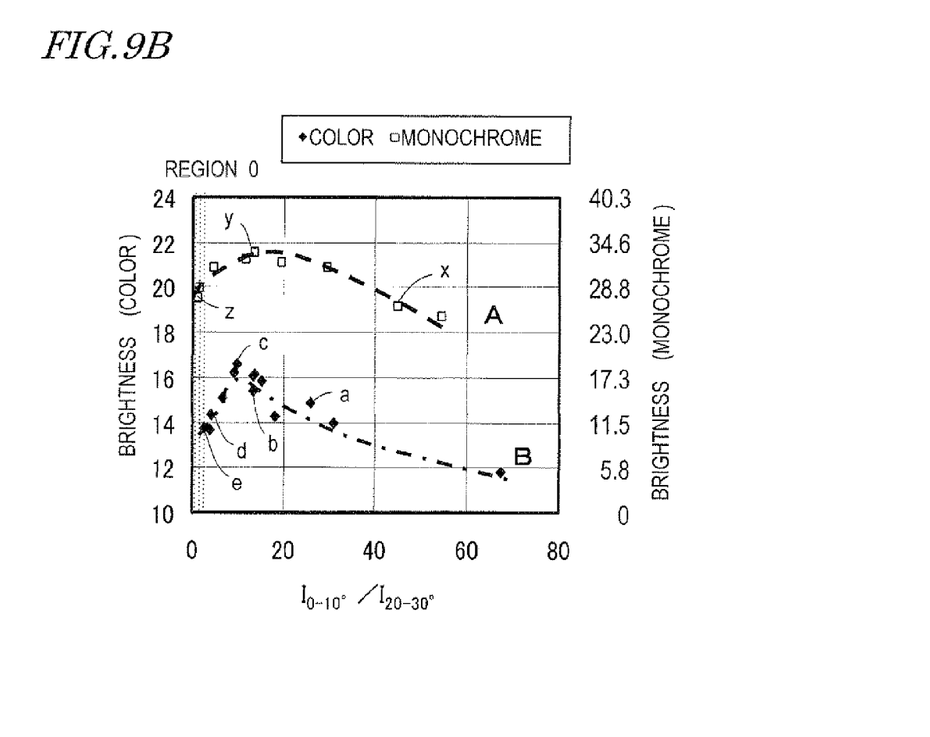
FIG. 9B A graph showing relationships between a logarithm of a ratio representing a degree of scatter of the scattering-type liquid crystal layer and the brightness of a liquid crystal display device in Embodiment 2.

In the graphs of FIG. 9A and FIG. 9B, the brightness of the sample liquid crystal display devices once increases as the scatter becomes weaker, but decrease as the scatter becomes further weaker. As described earlier, when the scatter of the scattering-type liquid crystal layer is strong, the light entering the scattering liquid crystal panel from the light source is scattered by the scattering-type liquid crystal layer so as to spread, and thus the component which is confined inside the scattering liquid crystal panel increases, so that a sufficient brightness cannot be obtained. When the scatter becomes weak, the component which has been confined inside the scattering liquid crystal panel now comes out of the scattering liquid crystal panel so as to reach the viewer, whereby bright display can be realized. When the scatter becomes even weaker, the light entering from the light source does not sufficiently spread, and most components return in the direction of the light source, thus resulting in a decrease in the component that reaches the viewer, whereby the brightness is lowered.

Again, for reference, FIG. 9A and FIG. 9B illustrate as region 0 a range of degree of scatter of the scatter liquid crystal layers of Patent Documents 1 and 2. The scatters by the scattering-type liquid crystal layers of Patent Documents 1 and 2 are too strong for a retroreflection-type liquid crystal display device.

From the sample liquid crystal display device, it is determined that a practical color liquid crystal display device would have a brightness 14 or more. As is also shown in Table 2, sample liquid crystal display device e has a brightness of less than 14, thus resulting in an insufficient brightness, whereas sample liquid crystal display devices a to d have a brightness of 14 or more, thus realizing bright display.

Now, the values representing the degree of scatter of the scattering-type liquid crystal layer that would correspond to a brightness of 14 or more of the sample liquid crystal display device will be discussed. As will be understood from FIG. 9A, the range of values representing the degree of scatter of the scattering-type liquid crystal layer that is suitable for a color liquid crystal display device is $0.7<\log(I_{0-10}/I_{20-30})<1.4$. In FIG. 9A, this range is indicated as region II. Note that this range corresponds to $5.0<I_{0-10}/I_{20-30}<20$ in FIG. 9B. Moreover, it is clear from FIG. 9A that a monochrome liquid crystal display device has a sufficiently high brightness in this range. Region II of values representing the degree of scatter of the scattering-type liquid crystal layer that is suitable for a color liquid crystal display device is narrower than region I which is suitable for a monochrome liquid crystal display device.

Note that, since color filters are provided in the liquid crystal display device 100 of the present embodiment, if the color of a color filter which is traveled through by the light entering the scattering liquid crystal panel is different from the color of the color filter which is traveled through by the light going out from the scattering liquid crystal panel, the intensity of the outgoing light will be further weaker. Moreover, as described earlier, a type having the highest chroma among color filters that are suitable for actual use is employed as the color filters in the liquid crystal display device 100 of the present embodiment; bright display cannot be realized with anything having a higher chroma than this. Note that color filters having a lower chroma than that of the color filters of this retroreflection-type liquid crystal display device would fall between Embodiment 1 and Embodiment 2.

As will be understood from the results of using sample scattering-type liquid crystal layers with different scattering characteristics, when the scattering liquid crystal panel 110 itself satisfies the relationship of $0.7<\log(I_{0-10}/I_{20-30})<1.4$, where $I_{0-10}$ represents a mean value of the scattering intensity of light which is emitted in a range from 0 degrees to 10 degrees, and $I_{20-30}$ represents a mean value of the scattering intensity of light emitted in a range from 20 degrees to 30 degrees, the color liquid crystal display device 100 can realize bright display.

Whereas the reference value of brightness for a monochrome liquid crystal display device is "30", the reference value of brightness for a color liquid crystal display device is "14", thus being unequal. This is due to the subjective perceptions and preoccupations of manufacturers or viewers. For example, when a monochrome liquid crystal display device and a color liquid crystal display device having a brightness 20 are compared, the monochrome liquid crystal display device would appear dark, whereas the color liquid crystal display device would appear sufficiently bright. If the brightness of reflection-type liquid crystal display devices of the active driving method that are commonly available on the market was measured, the value of a monochrome liquid crystal display device would read from about 27 to about 36, whereas the value of a color liquid crystal display device would read about 11.

Although the retroreflection plate is provided on the outside of the scattering liquid crystal panel 110 in the liquid crystal display devices of Embodiments 1 and 2 described above, the present invention is not limited thereto. The retroreflection plate may be provided between the scattering-type liquid crystal layer and the transparent substrate of the TFT substrate.

In the above descriptions, the scattering-type liquid crystal layer takes a transparent state under an applied voltage, and takes a scattering state in the absence of an applied voltage; however, the present invention is not limited thereto. The scattering-type liquid crystal layer may take a scattering state under an applied voltage, and take a transparent state in the absence of an applied voltage. In this case, the scattering-type liquid crystal layer will be produced in a similar manner except for employing as the photocurable monomer a "mesomorphic monomer" having a mesogen group in a portion of its molecular structure, and performing an alignment treatment for aligning the liquid crystal material and the mesomorphic monomer in a certain direction.

Note that the entire disclosure of Japanese Patent Application No. 2007-132908, on which the present application claims priority, is hereby incorporated by reference.

INDUSTRIAL APPLICABILITY

According to the present invention, a retroreflection-type liquid crystal display device which can realize bright display can be provided. Moreover, the retroreflection-type liquid crystal display device of the present invention does not include a backlight, so that its power consumption can be reduced. Moreover, since the scattering liquid crystal panel of a retroreflection-type liquid crystal display device performs a weak scatter than do a projection-type liquid crystal display device and a transmission-type liquid crystal display device, its applied voltage may be small, thus permitting a further reduction in power consumption. Moreover, since the retroreflection-type liquid crystal display device of the present invention does not use polarizers, it can have an improved efficiency of light utilization and also a flexibility.

The invention claimed is:

1. A liquid crystal display device comprising:
a scattering liquid crystal panel including a scattering-type liquid crystal layer which is capable of taking a transparent state and a scattering state, the scattering liquid crystal panel having a front face and a rear face, the scattering liquid crystal panel satisfying the relationship of $0.45 \leq \log(I_{0-10}/I_{20-30}) \leq 1.48$, where, regarding light which enters through the rear face of the scattering liquid crystal panel and goes out through the front face when the scattering-type liquid crystal layer is in the scattering state, $I_{0-10}$ represents a mean value of scattering intensity of light which goes out at an angle in a range from 0 degrees to 10 degrees with respect to a normal direction of the front face, and $I_{20-30}$ represents a mean value of scattering intensity of light which goes out in a range from 20 degrees to 30 degrees; and
a retroreflection plate used in combination with the scattering liquid crystal panel, the retroreflection plate retroreflecting at least a portion of light which enters through the front face of the scattering liquid crystal panel and travels toward the rear face.

2. The liquid crystal display device of claim 1, wherein the scattering liquid crystal panel satisfies the relationship of $0.7 \leq \log(I_{0-10}/I_{20-30}) \leq 1.4$.

3. The liquid crystal display device of claim 2, wherein the scattering liquid crystal panel further includes a color filter.

4. The liquid crystal display device of claim 1, wherein a distance between the scattering-type liquid crystal layer and the retroreflection plate is no less than 30 μm and no more than 100 μm.

5. The liquid crystal display device of claim 1, wherein the retroreflection plate is attached on an outside of the scattering liquid crystal panel via a resin.

6. A method of producing a liquid crystal display device, comprising the steps of:
providing a scattering liquid crystal panel including a scattering-type liquid crystal layer which is capable of taking a transparent state and a scattering state, the scattering liquid crystal panel having a front face and a rear face;
providing a retroreflection plate; and
combining the retroreflection plate with the scattering liquid crystal panel so that the retroreflection plate retroreflects at least a portion of light which enters through the front face of the scattering liquid crystal panel and travels toward the rear face, the method further comprising a step of:
before the retroreflection plate is combined with the scattering liquid crystal panel, determining whether the scattering liquid crystal panel satisfies the relationship of $0.45 \leq \log(I_{0-10}/I_{20-30}) \leq 1.48$, where, regarding light which enters through the rear face of the scattering liquid crystal panel and goes out through the front face when the scattering-type liquid crystal layer is in the scattering state, $I_{0-10}$ represents a mean value of scattering intensity of light which goes out at an angle in a range from 0 degrees to 10 degrees with respect to a normal direction of the front face, and $I_{20-30}$ represents a mean value of scattering intensity of light which goes out in a range from 20 degrees to 30 degrees.

7. The method of claim 6, comprising determining whether the scattering liquid crystal panel satisfies $0.7 \leq \log(I_{0-10}/I_{20-30}) \leq 1.4$.

8. The method of claim 7, wherein the scattering liquid crystal panel comprises a color filter.

9. The method of claim 6, wherein a distance between the scattering-type liquid crystal layer and the retroreflection plate is no less than 30 μm and no more than 100 μm.

10. The method of claim 6, wherein the retroreflection plate is attached to an outside of the scattering liquid crystal panel via a resin.

* * * * *